United States Patent [19]

Walker

[11] 4,307,856
[45] Dec. 29, 1981

[54] ANNULAR WING

[75] Inventor: Harold J. Walker, Lancaster, Calif.

[73] Assignee: The United States of America as represented by the Administrator of the National Aeronautics & Space Administration, Washington, D.C.

[21] Appl. No.: 43,911

[22] Filed: May 30, 1979

Related U.S. Application Data

[63] Continuation of Ser. No. 880,725, Feb. 24, 1978, abandoned.

[51] Int. Cl.³ .............................................. B64C 39/06
[52] U.S. Cl. ................................. 244/12.2; 244/23 C; 244/34 A; 244/93
[58] Field of Search ................... 244/12.2, 23 C, 34 A, 244/93

[56] References Cited

U.S. PATENT DOCUMENTS

| | | | |
|---|---|---|---|
| 2,953,320 | 9/1960 | Parry | 244/12.2 |
| 3,253,805 | 5/1966 | Taylor | 244/12.2 |
| 3,355,124 | 11/1967 | Kelsey | 244/23 C X |
| 3,387,801 | 6/1968 | Kelsey | 244/23 C |
| 3,432,120 | 3/1969 | Guerrero | 244/12.2 |
| 3,489,374 | 1/1970 | Morcom | 244/12.2 |
| 3,985,320 | 10/1976 | Brady | 244/93 |
| 4,120,468 | 10/1978 | Fischer | 244/12.2 |

Primary Examiner—Charles E. Frankfort
Attorney, Agent, or Firm—Paul F. McCaul; John R. Manning

[57] ABSTRACT

An annular wing particularly suited for use in supporting in flight an aircraft characterized by the absence of directional stabilizing surfaces. The wing comprises a rigid annular body of a substantially uniformly symmetrical configuration characterized by an annular positive lifting surface and cord line coincident with the segment of a line radiating along the surface of an inverted truncated cone whereby a decalage is established for the leading and trailing semi-circular portions of the body, relative to instantaneous line of flight, and a dihedral for the laterally opposed semi-circular portions of the body, relative to the line of flight, the direction of flight and climb angle or glide slope angle being established by selectively positioning the center of gravity of the wing ahead of the aerodynamic center along the radius coincident with an axis for a selected line of flight.

2 Claims, 15 Drawing Figures

ANNULAR WING

ORIGIN OF THE INVENTION

The invention described herein was made by an employee of the United States Government and may be manufactured and used by or for the Government for Government purposes without the payment of any royalties thereon or therefor.

This is a division, of application Ser. No. 880,725, filed Feb. 24, 1978 said application being now abandoned.

BACKGROUND OF THE INVENTION

1. Field of the Invention

The invention generally relates to an unique wing and more particularly to an unique wing for aircraft characterized by the absence of directional stabilizing surfaces, such as empennage fins and the like.

2. Description of the Prior Art

The prior art is replete with wings of various configurations adapted to be employed in supporting air craft in flight. Included among the wings previously employed and suggested for use are disk shaped bodies having paddle wheels mounted therein whereby rotation is imparted to the bodies about their axes to produce lift. For example, see the patent to Lemberger U.S. Pat. No. 3,182,929. Additionally, disk shaped bodies employing propellers and the like for producing required lift have been proposed, see U.S. Pat. No. 3,432,120. In each instance, the configuration of the disk shaped body is not relied upon to produce lift.

Most conventional aircraft equipped with lift-producing wings are characterized by directional stabilized flight properties resulting from a use of non-planar lateral stabilizing surfaces. Unfortunately, with the use of such surfaces there is an attendant loss in simplicity and efficiency.

It is, therefore, the general purpose of the instant invention to provide a highly maneuverable wing which is simple in concept, economic to fabricate, characterized by stable horizontal flight properties at subsonic speeds, in all directions, and capable of flight at large angles of attack under powered flight conditions.

OBJECTS AND SUMMARY OF THE INVENTION

It is the general purpose of the instant invention to provide an unique wing.

It is another object to provide an unique wing for tailess aircraft.

It is another object to provide an unique simple and economic wing particularly adapted for use in operational environments requiring a high degree of maneuverability.

It is another object to provide an unique statically stable wing particularly suited for use in supporting aircraft in flight characterized by the absence of directional stabilizing surfaces.

It is another object to provide an unique statically stabilized wing characterized by a high degree of maneuverability at subsonic speeds.

It is another object to provide an unique wing capable of achieving uniform stabilized flight in all peripheral directions of flight, depending only on adjustment of a center of gravity location for glide slope and direction of flight control.

Another object is to provide an unique wing particularly suited for use in supporting a flight power aircraft although not necessarily restricted in use thereto since the wing of the instant invention possesses similar utility when employed as a free floating body or a tethered kite.

These and other objects and advantages are achieved through the use of an annular wing comprising a rigid annular body of a substantially uniformly symmetric configuration characterized by a decalage for the leading and trailing semi-circular portions of the body, relative to an instantaneous line of flight, and a dihedral for the laterally opposed semi-circular portions of the wing and a variably positioned center of gravity for controlling direction of line of flight as will become more readily apparent by reference to the following description and claims in light of the accompanying drawings.

DESCRIPTION OF THE PREFERRED EMBODIMENT

Figure 1:
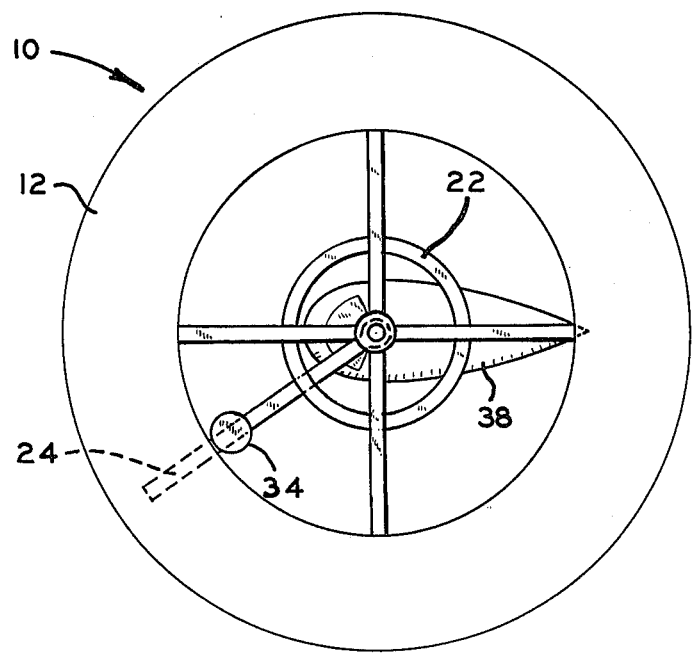
FIG. 1 is a top plan view, not to scale, of a tailless aircraft supported in flight by an annular wing which embodies the principles of the instant invention.

Referring now to the drawings with more particularity, wherein like reference characters designate like or corresponding parts throughout the several views, there is shown in FIG. 1 an aircraft, generally designated 10, supported by a statically stable wing 12 which embodies the principles of the instant invention.

Figure 2:
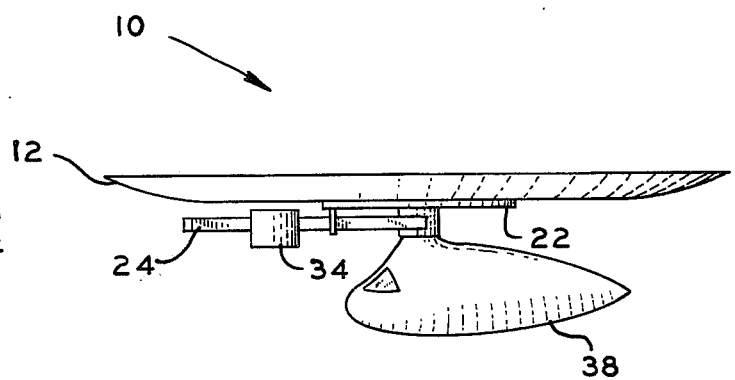
FIG. 2 is an elevational view of the aircraft shown in FIG. 1.
Figure 3:
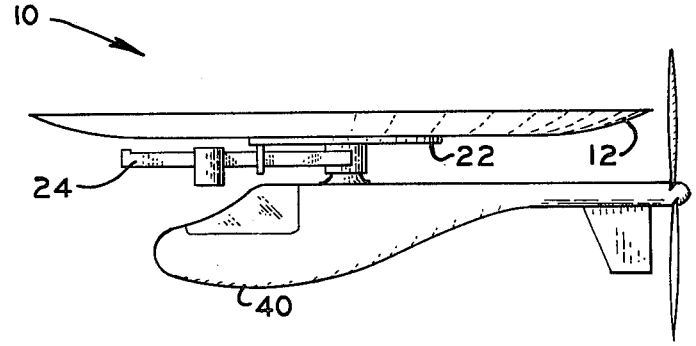
FIG. 3 is an elevational view of an aircraft of another category supported by annular wing embodying the principles of the instant invention.

It is important to appreciate that the particular mission for which the aircraft 10 is designed is varied as desired. Consequently, it is to be understood that the utility of the wing 12 is not limited to any specific aircraft. Moreover, it should be further understood that the depiction of the aircraft 10, as shown in FIGS. 1, 2 and 3, is for purposes of exemplifying the utility of the wing and not the aircraft. For example, the aircraft 10 may, where desired, comprise a sail plane or the like, as illustrated in FIGS. 1 and 2, or a powered aircraft as illustrated in FIG. 3.

Therefore, since the invention resides in the wing 12 herein described, and the utility of the wing is not limited to a specific category, class or type of aircraft, the description of the invention hereinafter is directed primarily to wing 12 and its flight characteristics.

Figure 4:
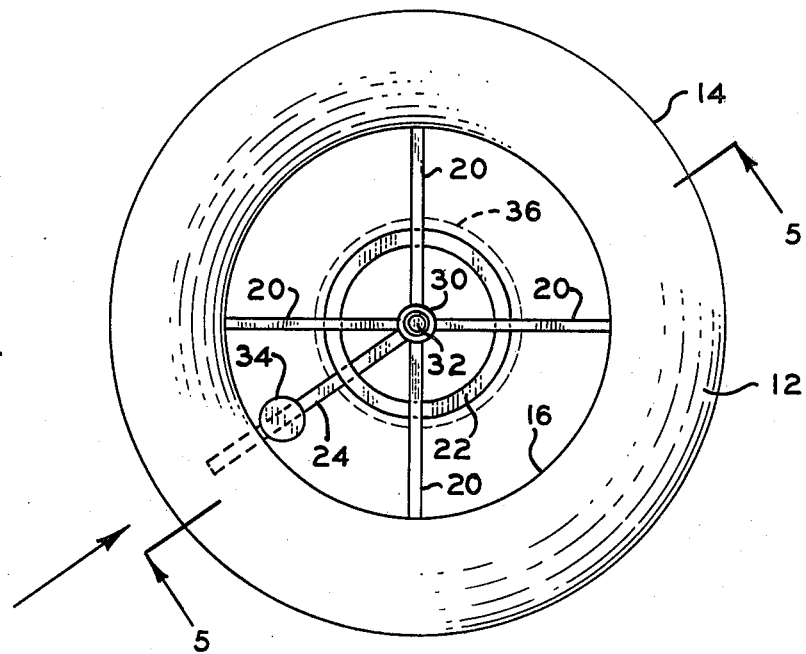
FIG. 4 is a top plan view diagrammatically depicting one manner in which the location of the center of gravity for the wing is varied.

Turning now to FIG. 4, it can be seen that the wing 12 is of an annular configuration and includes a uniformly curved outer edge 14 and a uniformly curved inner edge 16. As best illustrated in FIG. 5, the structure of the wing 12 is symmetrical in all vertical planes and the chord, designated 18, is coincident with a segment of a line extending from the apex of an imaginary truncated right cone circular to the periphery of its base.

In flight the wing 12 may be considered to include a leading semicircular portion and a trailing semicircular portion, relative to the line of flight. The chords 18, FIG. 5, of the leading and trailing semicircular portions of the wing are in flight set at different angles of incidence, as illustrated in FIG. 6. The angular difference between the chords of the leading and trailing semicircular portions of the wing is herein referred to as decalage.

Since the chords 18 are, as aforementioned, coincident with segments of lines extending from the apex of an imaginary truncated right circular cone, the lateral semicircular portions of the wing 12, relative to the line of flight, impart a transverse inclination to the lower surface of the wing, herein referred to as dihedral.

Figure 5:
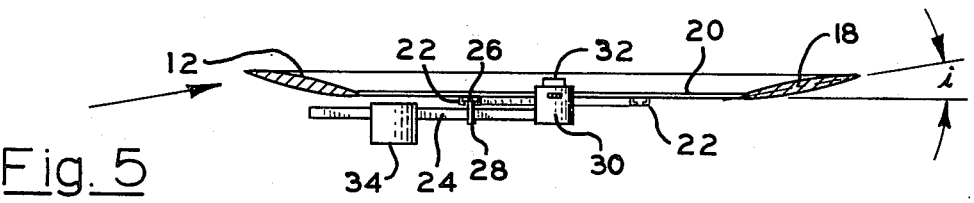
FIG. 5 is a cross-sectional view taken along line 5—5 of FIG. 4.
Figure 6:
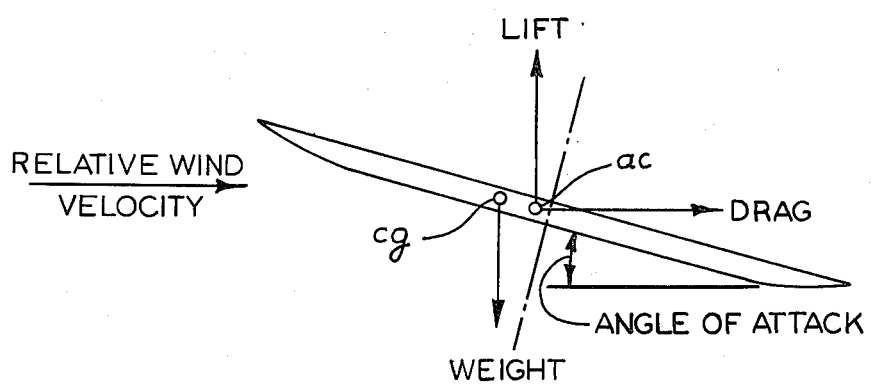
FIG. 6 is a diagrammatic view of the wing shown depicting forces acting thereon during flight.

As shown in FIG. 5, the wing sections are of a common size and shape and are symmetric with respect to the chords. Due to the symmetry of the wing 12 and the commonality of the size and shape of the wing sections, the wing possesses identical lift characteristics in all directions, provided the center of gravity is placed outwardly from the geometric center in the direction of flight and forward of the aerodynamic center for providing for longitudinal stability, as will become more readily apparent. The angle of incident for the leading and trailing portions are equal in magnitude but opposite in sign as a result of the symmetry.

The wing, as shown, is provided with a pair of transverse beams 20 diametrically related to the opening defined by the inner edge 16 of the wing, the purpose of which is to support an annular track 22 for a pivotal ballast arm 24. While the track 22 is of any suitable design, as shown, the track includes a supporting surface for a track 26 from which is suspended a hanger 28 connected to the ballast arm 24. As a practical matter, the ballast arm 24 also is supported at its inboard end by a pedestal 30 mounted on the beams 20 at the center of the wing 12. As shown, the ballast arm is connected with a motor 32, for example, which serves to drive the arm in pivotal displacement along a circular path.

THE ANGLE OF ATTACK, as illustrated in FIG. 6, for the wing 12 is established in a manner readily understood by those familiar with the design of aerodynamic bodies including wings and the like. As depicted in FIG. 6, the wing 12 is in flight with the RELATIVE WIND VELOCITY acting in opposition to the direction of flight, or in the direction of DRAG. The center of gravity, cg, is disposed in leading relation with the aerodynamic center, ac, of the wing, while the aerodynamic center leads the geometric center of the wing, indicated by an axis of symmetry, not designated, projected through the annular wing 12. Hence, it can be appreciated that the resultant LIFT tends to pitch the wing 12 in a positive direction about a pitch axis, not designated, while WEIGHT acts at the center of gravity cg in opposition to LIFT. It should now be apparent that the ANGLE OF ATTACK for the wing 12 is stabilized when the pitching moment for the wing acting about the pitch axis equals zero.

The angle of incidence for the airfoil section provides a positive zero lift pitching moment for establishing longitudinal stability at the desired lift coefficient.

In order to control the angle of attack and flight path angle for the wing 12, there is mounted on the ballast arm 24 a ballast 34 of mass sufficient to vary the location of the center of gravity, cg, of the wing 12 as the position of the ballast is varied. Since the arm 24 is displaceable along a circular path the mass of the ballast 34 aldo is displaceable so that the wing's center of gravity cg may be repositioned along a circular path, designated 36, to a series of positions located in spaced relation with the aerodynamic center ac of the wing. Of course, while the position of the wing's center of gravity cg may be fixed by fixing the position of the ballast arm 24, relative to the track 22, where so desired, the ballast arm 24 may be permitted to swivel freely, in which case the position of the center of gravity is free to shift.

In order to control flight path angle, it is desirable to provide for a repositioning of the ballast 34 relative to the radius of the wing. The particular manner in which such repositioning of the ballast 34 is accommodated is deemed to be a matter of convenience only, particularly since various mechanisms are available for this purpose. For example, the mass 34, where desired, is displaced by an extensible hydraulic ram, not shown, connected with the ballast and employed for advancing and retracting the ballast along the length of the arm. In any event, it should be apparent that in order to achieve directional control for the wing 12, control of the location of the center of gravity for the wing along the path 36 must be facilitated. Similarly, in order to achieve control of the flight path angle for the wing, control must be established over the position of the ballast 34 along the radius of the wing. Hence, control of the flight path angle and direction of flight for the wing is accomplished solely by controlling the location of the center of gravity for the wing relative to its aerodynamic center ac.

As shown in the drawings, for illustrative purposes, a glass canopy 38 is mounted on the pedestal 30 and is employed as a payload carrying compartment. However, where desired, the aircraft comprises a powered aircraft 40 suspended from the pedestal. Since the particular manner in which the payload compartment is mounted and employed forms no specific part of the instant invention, a detailed description thereof is omitted.

The various properties of the wing 12, herein designated as lift curve slope, lift-to-drag ratio, aerodynamic center, longitudinal static stability and lateral static stability and may be computed for demonstrating feasibility, according to the following calculations:

Lift Curve Slope

Figure 7:
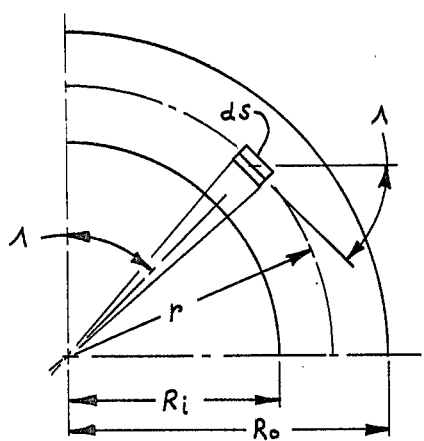
FIG. 7 is a fragmented diagrammatic view employed in calculating the lift curve slope for the wing.
Figure 14:
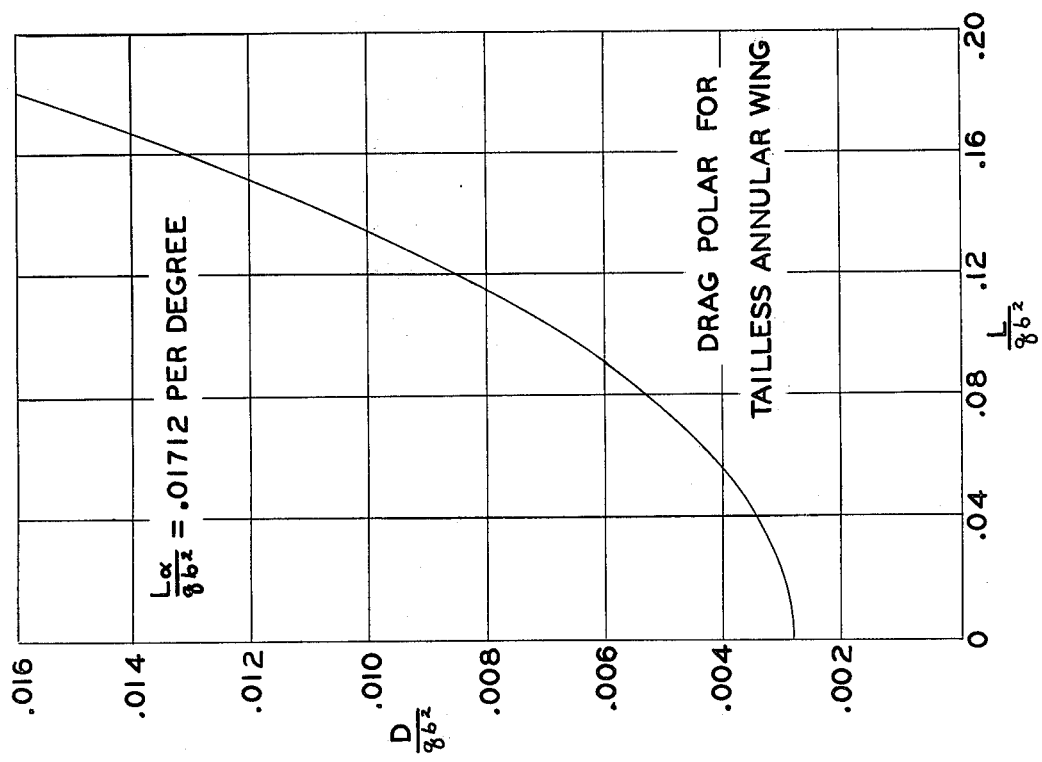

The lift curve slope, as depicted in FIG. 14, can be mathematically determined as follows with reference particularly to FIG. 7. Reference: DATCOM, USAF Flight Dynamics Laboratory, Wright-patterson Air Force Base, Dayton, Ohio.

$$C_{L\alpha} = \frac{2\pi A}{2 + \sqrt{(\beta A)^2 \left[1 + \frac{1}{\beta^2} \tan^2(\Lambda c/2)\text{eff}\right]} + 4}$$

-continued $$A = \frac{b^2}{S} = \frac{b^2}{\pi(R_o^2 - R_i^2)} \quad \bar{\beta} = \sqrt{1 - \bar{M}^2}$$

b = span = $2R_o$
$R_o$ = wing outer radius
$R_i$ = wing inner radius
$\bar{M}$ = Mach number
S = wing area
$(\Lambda c/z)$eff = effective sweep angle of midchord line
Approximated as follows:

$$\cos(\Lambda c/2)\text{eff} = \frac{4}{S} \int_o^{\pi/2} \int_{R_i}^{R_o} \cos\Lambda c/z \, ds \, ds = r dr d\Lambda$$

$$= \frac{\left[\left[\frac{r^2}{2}\right]_{R_i}^{R_o} \sin\Lambda c/2\right]_o^{\pi/2}}{\frac{\pi}{4}(R_o^2 - R_i^2)}$$

$$= \frac{2}{\pi} = .6366$$

$(\Lambda c/2)\text{eff} = 50.46^\infty$ $\tan(\Lambda c/2)\text{eff} = 1.211$ $$C_{L\alpha} = \frac{2\pi A}{2 + \sqrt{(\bar{\beta}A)^2 \left[1 + \left(\frac{1.211}{\bar{\beta}}\right)^2\right] + 4}}$$

$$\frac{L}{\alpha q b^2} = \frac{2\pi}{2 + \sqrt{(\bar{\beta}A)^2 \left[1 + \left(\frac{1.211}{\bar{\beta}}\right)^2\right] + 4}}$$

L = lift
q = dynamic pressure
For low speeds ($\bar{\beta}$ = 1)

Lift-to-drag ratio (L/D):

$$\frac{L}{D} = \frac{\frac{L}{qb^2}}{\frac{D_o}{qb^2} + \frac{1}{\pi e}\left(\frac{L}{qb^2}\right)^2}$$

$D_o$ = zero lift drag = $qS_wC_f$
$S_w$ = wetted area ≈ 2S
$C_f$ = skin friction coefficient
e = Oswald efficiency factor
For nominal size single-place aircraft, Reynold's number is $Re = 3 \text{ to } 8 \times 10^6 \quad (\bar{M} = 0.2)$ From reference DATCOM $C_f = 0.0035$ (approx.)

Hence $$\frac{D_o}{qb^2} = 2\frac{S_w}{b^2}C_f = \frac{\pi}{2}C_f\left[1 - \left(\frac{R_i}{R_o}\right)^2\right]$$

$$= .00550\left[1 - \left(\frac{R_i}{R_o}\right)^2\right]$$

For parabolic polar $$\left(\frac{L}{D}\right)\max = \frac{1}{2}\sqrt{\frac{\pi^3}{D_o/qb^2}} = \frac{1}{2}\sqrt{\frac{\pi A e}{2C_f}}$$

$$\left(\frac{L}{qb^2}\right)\max L/D = \sqrt{\pi e \frac{D_o}{qb^2}} = \sqrt{\frac{2\pi e C_f}{A}}$$

Assuming e ≈ 0.8, following results are obtained

| $\frac{R_i}{R_o}$ | A | $\frac{D_o}{qb^2}$ | $\left(\frac{L}{D}\right)_{max}$ | $\left(\frac{L}{qb^2}\right)_{max \frac{L}{D}}$ | $(C_L)^*_{max \frac{L}{D}}$ | $(\alpha - \alpha_o)^{**}_{max}$ |
|---|---|---|---|---|---|---|
| 0 | 1.273 | .00550 | 10.7 | .1176 | .150 | 5.19° |
| .5 | 1.70 | .00413 | 12.4 | .1017 | .173 | 4.96° |
| .6 | 1.99 | .00352 | 13.4 | .0940 | .187 | 4.90° |
| .7 | 2.50 | .00281 | 15.0 | .0839 | .210 | 4.90° |
| .8 | 3.54 | .00198 | 17.8 | .0705 | .250 | 5.09° |
| .9 | 6.70 | .00105 | 24.5 | .0512 | .343 | 5.93° |

*$C_L = A \times \frac{L}{qb^2}$

**$\alpha - \alpha_o = \frac{C_L}{C_{L\alpha}}$

| $\frac{R_i}{R_o}$ | A | $\frac{L}{\alpha q b^2}$ | $C_{L\alpha}(\deg^{-1})$ |
|---|---|---|---|
| 0 | 1.273 | 1.301 | .0289 |
| .5 | 1.7 | 1.178 | .0349 |
| .6 | 1.99 | 1.100 | .0382 |
| .7 | 2.50 | .981 | .0428 |
| .8 | 3.54 | .794 | .0491 |
| .9 | 6.70 | .494 | .0578 |

Lift-to-drag Ratio

Figure 15:
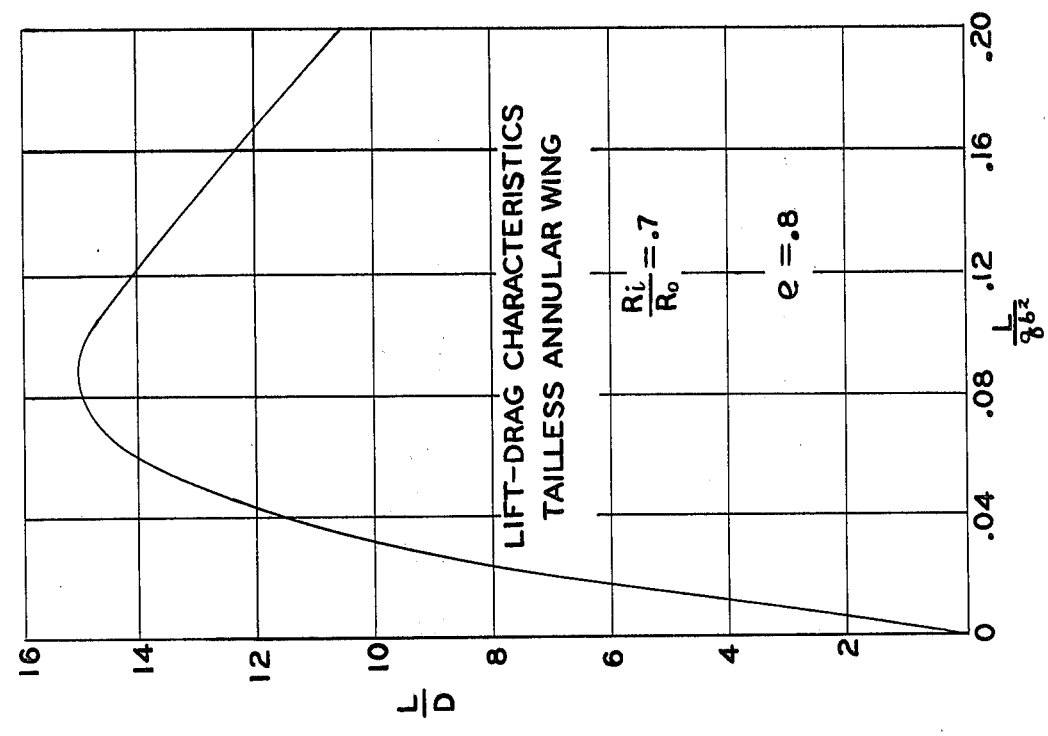
FIGS. 14 and 15 are graphic views illustrating lift-drag characterstics of the wing.

The lift-to-drag ratio as plotted in FIG. 15, can be mathematically determined as follows:

Aerodynamic Center

Figure 8:
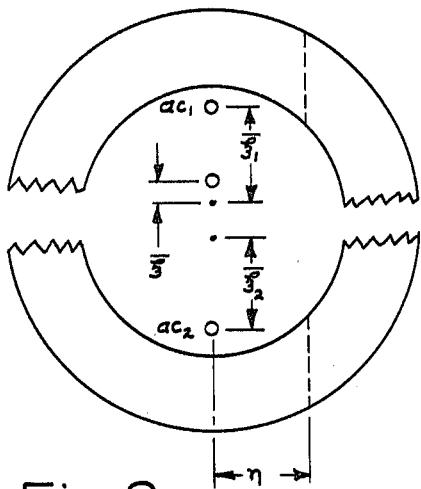
FIGS. 8, 9 and 10 are diagrammatic views employed in calculating the aerodynamic center for the wing.
Figure 9:
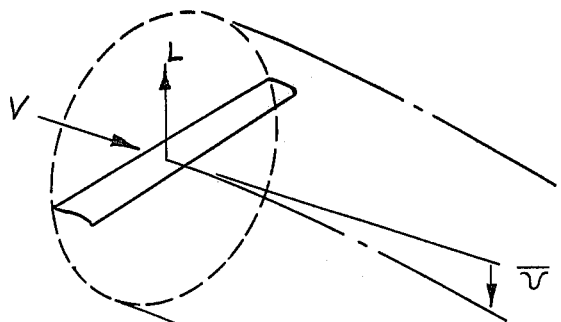
Figure 10:
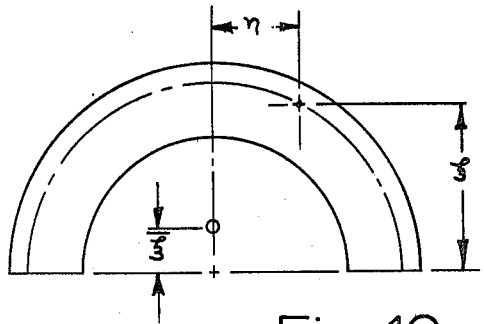

The aerodynamic center can be mathematically determined approximately as follows with reference being made particularly to FIGS. 8, 9 and 10. Let wing consist of forward (1) and rear (2) elements having individual aerodynamic centers (ac) located distance $\zeta$ from wing center (FIG. 8). Assume the span loading on each element to be elliptical $$L\eta = \frac{dL}{d\eta} = L_o\sqrt{1-\eta^2} \qquad L = L_o \int_o^1 \sqrt{1-\eta^2}d\eta$$

Assume also the downwash angle at element (2) due to element (1) to have an average value $\bar{\epsilon}$ $$L_1 = \frac{dL_1}{d\alpha}\alpha = L_{\alpha 1}\alpha \qquad L_2 = L_{\alpha 2}(\alpha - \bar{\epsilon})$$

The moment of lift about central axis then is:

$$L\bar{\zeta} = \bar{\zeta}_1 L_{\alpha 1}\alpha - \bar{\zeta}_2 L_{\alpha 2}(\alpha - \bar{\epsilon})$$

where $L = L_\alpha\alpha = L_1 + L_2$.

The lift slopes of elements (1) and (2) are identical (see DATCOM expression for lift slope) and hence half the value for the complete wing. Then $$L_\alpha\alpha\bar{\zeta} = L_\alpha/2\,[\bar{\zeta}_1\alpha - \bar{\zeta}_2(\alpha - \bar{\epsilon})]$$

Since the span loading is identical for both elements $$\bar{\zeta}_1 = \bar{\zeta}_2$$

$$\bar{\zeta} = \tfrac{1}{2}\bar{\zeta}_1(d\bar{\epsilon}/d\alpha)$$

An approximate estimate for $d\bar{\epsilon}/d\alpha$ is as follows:
The average downwash velocity at element (2) due to element (1) is assumed to be fully imparted immediately downstream from element (1) such that $\bar{v}$ = ave downwash velocity and $\bar{\epsilon} = \bar{v}/v$ Using Prandtl's approximation for momentum transfer $$L = \dot{M}\bar{v}$$

where m is the mass flow rate through the circular streamtube intercepted by the wing span b (FIG. 9), it follows that $$L = \left(\frac{\pi}{4}b^2\rho V\right)\bar{v} \qquad \rho = \text{air density}$$

$$\frac{L}{qb^2} = \frac{\pi}{2}\frac{\bar{v}}{v} = \frac{\pi}{2}\bar{\epsilon}$$

Hence $\quad \dfrac{d\bar{\epsilon}}{d\alpha} = \dfrac{2}{\pi}\dfrac{dL/d\alpha}{qb^2} = \dfrac{2}{\pi A}C_{L\alpha}$ It follows that $$\bar{\zeta} = \bar{\zeta}_1(C_L/\pi A)$$

An estimate of $\bar{\zeta}_1$ for the assumed elliptic loading on the semi-circular plan form is found by taking the lift moment of element (1) about the lateral axis through the wing center (FIG. 10):

$$\frac{dL}{d\eta}L\eta = L_o\sqrt{1-\eta^2}$$

$$\zeta^2 \quad \eta^2 = 1$$

-continued $$L = \int_o^1 L\eta\, d\eta$$

Then $\bar{\zeta}_1 L = \int_o^1 \zeta L\eta\, d\eta$ $$\bar{\zeta}_1 = \frac{\int_o^1 \sqrt{1-\eta^2} \times \sqrt{1-\eta^2}\, d\eta}{\int_o^1 \sqrt{1-\eta^2}\, d\eta} = \frac{8}{3\pi}$$

The aerodynamic center location therefore is given by $$\bar{\zeta} = \frac{8}{3\pi} \times \frac{C_{L\alpha}}{\pi A} = \frac{8}{3\pi^2}\left(\frac{L}{\alpha q b^2}\right) = .270 \times \frac{dL/d\alpha}{qb^2}$$

Typical values are as follows:

| $\dfrac{R_i}{R_o}$ | $\dfrac{L}{\alpha q b^2}$ | $\bar{\zeta}$ |
|---|---|---|
| 0 | 1.301 | .351 |
| .5 | 1.178 | .318 |
| .6 | 1.100 | .297 |
| .7 | .981 | .265 |
| .8 | .794 | .214 |
| .9 | .494 | .133 |

Longitudinal Static Stability

Figure 11:
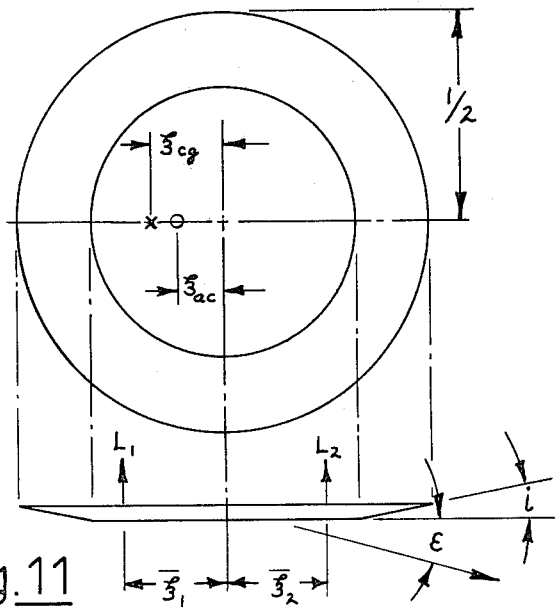
FIG. 11 is a diagrammatic view employed in calculating the longitudinal static stability for the wing.

The longitudinal static stability for the wing can be mathematically determined as follows, by reference being made to FIG. 11.

The lift moment about the lateral axis is given by $$M = L(\zeta_{ac} - \zeta_{cg})b + M_o$$
$M_o$ = zero lift moment The stability derivative becomes $$d(M/b)/dL = \zeta_{ac} - \zeta_{cg}$$

The zero-lift moment ($M_o$) is as follows:
Summing the lifts and moments about the lateral axis for elements (1) and (2) gives $$L = L_{\alpha 1}(\alpha + i) + L_{\alpha 2}(\alpha - i - \bar{\epsilon})$$

$$M = \bar{\zeta}_1 b\, L_{\alpha 1}(\alpha + i) - \bar{\zeta}_2 b\, L_{\alpha 2}(\alpha - i - \bar{\epsilon})$$

As before $\bar{\zeta}_1 = \bar{\zeta}_2$, $L_{\alpha 1} = L_{\alpha 2} = \tfrac{1}{2}L_\alpha$(wing)
And $\bar{\zeta}_1 = 8/3\pi$
Substituting $\bar{\epsilon} = (2/\pi)(L_1/qb^2) = (2/\pi)(L_{\alpha 1}/qb2)(\alpha + i)$
Gives $$L = \frac{L_\alpha}{2}\left[\alpha + i + \alpha - i - \frac{1}{\pi}\frac{L_\alpha}{qb^2}(\alpha + i)\right]$$

For $L = 0$, $\alpha = \alpha_o$, where $$\alpha_o = \frac{\frac{1}{\pi}\frac{L_\alpha}{qb^2}i}{2 - \frac{1}{\pi}\frac{L_\alpha}{qb^2}} = \frac{\frac{C_{L\alpha}}{\pi A}i}{2 - \frac{C_{L\alpha}}{\pi A}}$$

And $M_o$ becomes $$M_o = \frac{4}{3\pi} bL\alpha \left[ 2i + \frac{1}{\pi} \frac{L\alpha}{qb^2} (\alpha_o + i) \right]$$

$$\frac{M_o}{bL\alpha} = \frac{4}{3\pi} i \left[ \left( 2 + \frac{L\alpha}{\pi qb^2} \right) + \frac{\left(\frac{L\alpha}{\pi qb^2}\right)^2}{2 - \frac{L\alpha}{\pi qb^2}} \right] \text{ Or}$$

$$\frac{M_o}{bL\alpha i} = \frac{4}{3\pi} \left[ 2 + \frac{C_{L\alpha}}{\pi A} + \frac{\left(\frac{C_{L\alpha}}{\pi A}\right)^2}{2 - \frac{C_{L\alpha}}{\pi A}} \right]$$

Trim angle of attack then is $$\frac{\alpha_T - \alpha_o}{i} = \frac{M_o}{ibL\alpha} \cdot \frac{1}{\zeta_{cg} - \zeta}$$

Representatives values are as follows (low speed):

| $\frac{R_i}{R_o}$ | $\frac{L_\alpha}{\pi q b^2}$ | $\frac{M_o}{ibL_\alpha}$ | \multicolumn{4}{c}{$\frac{\alpha_T - \alpha_o}{i}$} |
|---|---|---|---|---|---|---|
| | | | $\zeta - \zeta_{cg} = .10$ | .15 | .20 | .25 |
| 0 | .4141 | 1.070 | 10.70 | 7.13 | 5.35 | 4.28 |
| .5 | .3750 | 1.045 | 10.45 | 6.97 | 5.28 | 4.18 |
| .6 | .3501 | 1.029 | 10.29 | 6.86 | 5.15 | 4.12 |
| .7 | .3123 | 1.006 | 10.06 | 6.71 | 5.03 | 4.02 |
| .8 | .2527 | .972 | 9.72 | 6.48 | 4.86 | 3.89 |
| .9 | .1572 | .921 | 9.21 | 6.14 | 4.61 | 3.68 |

Lateral Static Stability

Figure 12:
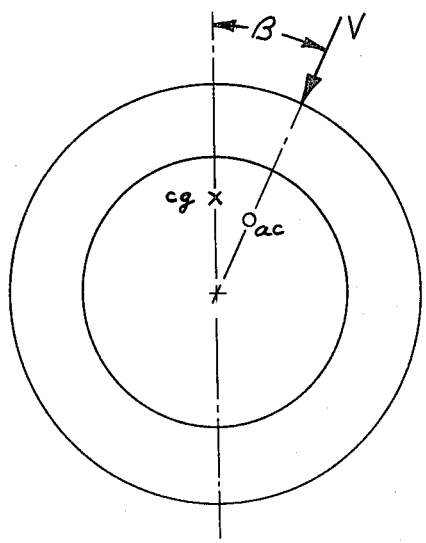
FIG. 12 is a diagrammatic view employed in calculating the lateral static stability for the wing.
Figure 13:
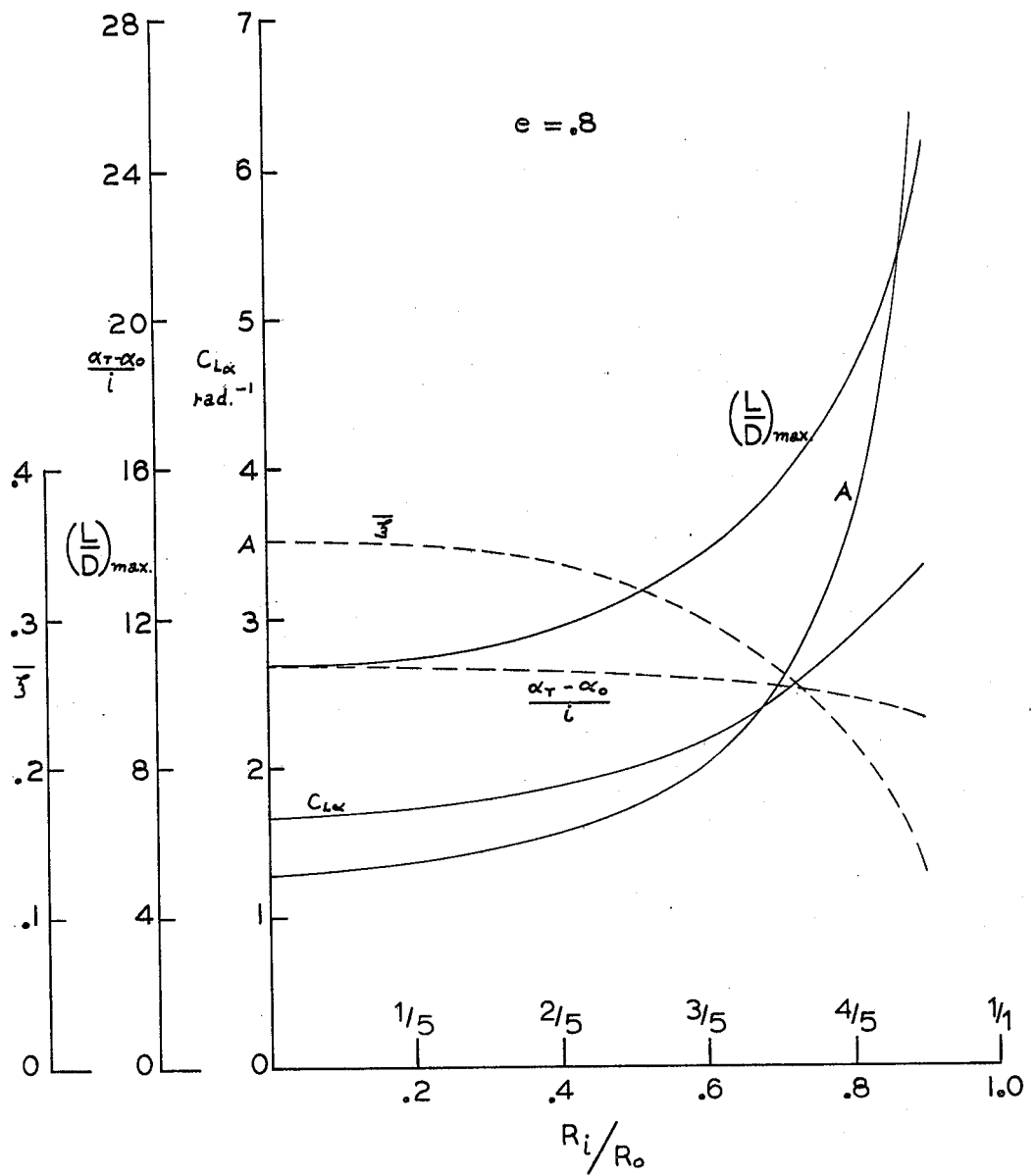
FIG. 13 is a graphic view depicting efficiency of the wing.

The lateral static stability for the wing can be determined as follows, reference being made to FIG. 12.

For positive sideslip angles ($\beta$), the induced rolling moment is $$L = \text{rolling moment} = -\zeta \, b \sin\beta \times L$$

Assuming $\beta$ to be small $$\sin\beta \approx \beta$$

$$\text{And } \frac{dL}{d\beta} = L_\beta = -\zeta_\beta \, bL$$

Letting $C_{l\beta} = \frac{dL/d\beta}{qsb}$

Then $C_{l\beta} = -\bar{\zeta} \, C_L$ (dihedral effect)

The dihedral effect is negative hence stabilizing.

The directional stability derivative ($C_{n\beta}$) is zero without a vertical tail. The Dutch roll stability ($W_n^2$) is as follows:

$$W_n^2 = \frac{qsb}{I_2} C_{n\beta}^* = \frac{qsb}{I_z} \left( C_{n\beta} - \frac{I_z}{I_x} C_{l\beta} \right)$$

$$= \frac{qsb}{I_x} \zeta \, C_L > O$$

$I_x$, $I_z$ are wing moments of inertia about longitudinal and vertical axes respectively.

$W_n^2$ is always positive, hence the wing is statically stable.

As an aid to understanding the various calculations herein set forth, the symbols employed are defined as follows:

ac: designates aerodynamic center
A: aspect ratio, $b^2/S$
b: wing span, $2R_o$
$C_D$: drag coefficient, $D/qS$
$C_{Do}$: drag coefficient at zero lift
$C_f$: skin friction coefficient, friction/$qS_w$
cg: designates center of gravity
$C_L$: lift coefficient, $L/qS$
$C_{L\alpha}$: $dC_L/d\alpha$
$C_7$: rolling moment coefficient, $L/qSb$
$C_{7\beta}$: dihedral effect, $dC_7/d\beta$
$C_n$: yawing moment coefficient, yawing moment/qSb
$C_{n\beta}$: directional stability derivative, $dC_n/d\beta$
$C_n{}^*\beta$: Dutch roll stability, $\approx C_{n\beta} - (I_x/I_z)\alpha C_{7\beta}$
d: designates derivative of variable
D: drag force
$D_o$: drag force at zero lift
$D/qb^2$: $C_D/A$
e: Oswald efficiency factor, $=1/(\pi A \, dC_D/dC_L^2)$ unity for elliptic span loading
i: angle of incidence of wing airfoil section
$I_x$: aircraft moment of inertia about longitudinal axis
$I_z$: aircraft moment of inertia about vertical axis
l: representative length for determining Reynolds number, $l = R_o - R_i$ in present case
L: lift force
$L_o$: lift at zero angle of attack
$L_\alpha$: $dL/d\alpha$
$L_n$: $dL/d_n$
$L/qb^2$: $C_L/A$
L: rolling moment
$L_\beta$: $dL/d\beta$
m: air mass flow rate, $\pi/4b^2 \rho V$
M: pitching moment
$M_o$: pitching moment at zero lift
$\bar{M}$: Mach number
q: dynamic pressure, $\frac{1}{2}\rho V^2$
r: radial distance from center of wing
$R_e$: Reynolds number, $Vl/\nu$
$R_i$: radius of inner wing edge
$R_o$: radius of outer wing edge
S: wing area
Sw: wetted area of wing
$\bar{v}$: average downwash velocity across aft wing span
V: aircraft velocity
x,y: longitudinal, lateral distance from wing center
$\alpha_o$: angle of attack at zero lift
$\alpha_T$: angle of attack at zero pitching moment
$\beta$: angle of sideslip
$\bar{\beta}$: $\sqrt{1 - \bar{M}^2}$
$\bar{\epsilon}$: average downwash angle across aft wing span, $\tan^{-1}\bar{v}/v \approx \bar{v}/v$
$\eta$: wing spanwise coordinate, $y/R_o = 2y/b$
$\zeta$: wing chordwise coordinate, $x/R_o = 2x/b$
$\bar{\zeta}$: distance of ac from wing center
$\zeta$cg: distance of cq from wing center λc/2: sweep angle at points along midchord line of wing (λc/2)eff: wing effective sweep angle (mean value for fore and aft wing semispans)

v: kinematic viscosity of air at 59° F.

P: mass density of air at 59° F.

$W_n$: Dutch roll static stability expressed in terms of undamped natural frequency Subscripts:

1, 2: designates fore and aft wing segments (respectively)

max.: maximum value

Other terms:

$|C_L|$: absolute value of $C_L$

Parabolic polar means drag is proportional to square of lift, $D/qb^2 = D_o/qb^2 = 1/\pi e(L/qb^2)^2$ Decalage angle=incidence of fore-wing half minus incidence of aft-wing half, i.e. 2i Elliptic loading means wing section lift varies elliptically across span.

While not shown, it is to be understood that where so desired, the annular wing can be employed in a configuration in which the position of the center of mass is fixed. In such instances, the wing is fitted with flaps for use in establishing control over the pitch and roll angles for the wing. Also, while not shown, it is to be understood that where the configuration includes a fixed center of gravity, it is highly desirable to accommodate withdrawal of low energy boundary layer air at the aft end of the wing, by ingestion in jet engine exhaust or a propeller slip stream, as the case may be.

In summary, with the wing 12 attached in supporting relation to an aircraft 10, as illustrated in FIGS. 1 through 3, lateral stability is provided for solely by the wing's dihedral effect which is uniform in all directions. The ratio of the inner to outer radius of the wing determines the efficiency of the wing. The angle of incidence for the airfoil section provides a positive zero lift pitching moment for establishing longitudinal stability at the desired lift coefficient. With the wing in flight, or as depicted in FIG. 6, the angle of incidence i for the leading airfoil section is positive producing an upward lift and the angle of incidence for the trailing section in negative producing a downward lift. The result is a positive pitching moment. Control of the flight path angle and direction of flight is achieved simply by repositioning the ballast 34, relative to the center of the wing.

It is believed that in practice lateral boundary layer flow will enable large angles of attack to be reached prior to wing stall, provided, of course, low energy boundary layer air is ingested at the aft end of the wing. Abrupt changes of flight direction are, of course, limited only by the occurrence of wing stall. Due to the annular shape of the wing, the wing possesses lift properties which may be approximated in theory by a circular lifting line. Finally, down-wash from the forward semi-circular element produces sufficient dihedral effect for lateral stability without a need for vertical directional stabilizing surfaces.

In view of the foregoing, it should be apparent that the wing 12 provides a practical solution to the problem of achieving directional control of an aircraft without employing stabilizing surfaces.

What I claim is:

1. In combination with a tailless aircraft an improved wing when in flight having a direction of flight, a climb angle, a geometric center, an aerodynamic center, and a center of gravity located forwardly of the aerodynamic center of the wing, relative to the direction of flight, comprising:

an unitary annular body defining an annular air foil symmetrically related to all planes passing through the geometric center thereof, and characterized by wing sections of uniform size and shape, each of said sections having a chord coincident with a segment of a line radiating from the apex of an inverted cone, said sections being symmetric relative to the chords, said annular body, when in flight, being longitudinally stabilized by a decalage effect and laterally stabilized by a dihedral effect uniform in all directions; means for altering the direction of flight including means for repositioning the center of gravity circumferentially relative to the geometric center of the wing; and means for varying the climb angle including means for repositioning the center of gravity relative to the radius of the wing.

2. In combination with a tailless aircraft an unitary wing capable of achieving in-flight longitudinal and lateral stability and abrupt changes in direction of flight while remaining substantially stabilized relative to its axis of yaw, comprising:

an unitary annular air foil characterized by wing sections of uniform size and shape, the chord of each section being coincident with a segment of a line radiating from the apex of an imaginary inverted cone and said section being substantially symmetric relative to the chord, said air foil being symmetrical to all planes passing axially through the geometric center thereof, and when in flight, being characterized by leading and trailing semi-circular portions, said wing in flight being longitudinally stabilized in response to the effects of a difference in angles of incidence for the leading and trailing portions of the air foil, and laterally stabilized relative to the direction of flight by a dihedral effect uniform in all directions.

* * * * *